(12) United States Patent
Fernandez et al.

(10) Patent No.: US 12,334,800 B2
(45) Date of Patent: Jun. 17, 2025

(54) ELECTRIC DRIVE COMPRISING HEAT EXCHANGER SECTION BETWEEN OIL AND A COOLING FLUID

(71) Applicant: Schaeffler Technologies AG & Co. KG, Herzogenaurach (DE)

(72) Inventors: Inaki Fernandez, Nuremberg (DE); Philipp Mattes, Herzogenaurach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 598 days.

(21) Appl. No.: 17/602,297

(22) PCT Filed: Apr. 7, 2020

(86) PCT No.: PCT/DE2020/100282
§ 371 (c)(1),
(2) Date: Oct. 8, 2021

(87) PCT Pub. No.: WO2020/207537
PCT Pub. Date: Oct. 15, 2020

(65) Prior Publication Data
US 2022/0190685 A1    Jun. 16, 2022

(30) Foreign Application Priority Data

Apr. 9, 2019  (DE) .................. 10 2019 109 313.9

(51) Int. Cl.
*H02K 9/193*    (2006.01)
*B60K 1/00*    (2006.01)
(Continued)

(52) U.S. Cl.
CPC ............ *H02K 9/193* (2013.01); *B60K 1/00* (2013.01); *H02K 5/18* (2013.01); *H02K 5/203* (2021.01);
(Continued)

(58) Field of Classification Search
CPC .......... H02K 9/193; H02K 5/203; H02K 5/18; B60K 1/00; B60K 2001/005; B60K 2001/006
See application file for complete search history.

(56) References Cited

U.S. PATENT DOCUMENTS 3,592,293 A * 7/1971 Frincke ................ F01M 11/065
                                                       123/196 R
5,585,681 A * 12/1996 Bitsche .................. B60K 11/02
                                                       310/68 R
(Continued)

FOREIGN PATENT DOCUMENTS

CN    108367669 A    8/2018
DE    4417432 A1    12/1994
(Continued)

*Primary Examiner* — Tulsidas C Patel
*Assistant Examiner* — Robert E Mates
(74) *Attorney, Agent, or Firm* — Volpe Koenig (57) ABSTRACT

An electric drive provides transmission oil cooling. An oil circuit supplies the transmission with oil. A cooling circuit cools a supply device and/or an electric motor with a coolant. A heat exchanger portion is coupled on one side to the cooling circuit and on the other side to the oil circuit. The supply device is arranged in a supply housing region. The heat exchanger portion forms a wall portion of the supply housing region. An end cover closes the heat exchanger portion. The end cover has at least one functional region, wherein the functional region is designed as a counterpart cooling structure, as an oil sump region and/or as a pump interface for coupling an oil pump.

9 Claims, 8 Drawing Sheets

(51) Int. Cl.
*H02K 5/18* (2006.01)
*H02K 5/20* (2006.01)

(52) U.S. Cl.
CPC .. *B60K 2001/005* (2013.01); *B60K 2001/006* (2013.01)

(56) References Cited

U.S. PATENT DOCUMENTS

| | | | |
|---|---|---|---|
| 6,198,183 B1 * | 3/2001 | Baeumel | H02K 5/225 |
| | | | 310/52 |
| 6,201,365 B1 | 3/2001 | Hara et al. | |
| 2004/0124722 A1 | 7/2004 | Uchida et al. | |
| 2004/0150271 A1 * | 8/2004 | Koga | H02K 9/19 |
| | | | 310/64 |
| 2006/0213462 A1 * | 9/2006 | Horing | F16H 57/0415 |
| | | | 123/41.23 |
| 2009/0206662 A1 * | 8/2009 | Kakuda | B60K 6/445 |
| | | | 363/141 |
| 2017/0096985 A1 * | 4/2017 | Bardia | H02K 7/183 |

FOREIGN PATENT DOCUMENTS

| | | |
|---|---|---|
| DE | 10360983 A1 | 7/2004 |
| DE | 10315684 A1 | 10/2004 |
| DE | 102011084030 A1 | 4/2013 |
| DE | 112008002870 B4 | 5/2015 |
| DE | 10296733 B4 | 4/2016 |
| DE | 102016123192 A1 | 6/2018 |
| DE | 102018130124 A1 | 5/2020 |
| EP | 0951131 A2 | 10/1999 |
| EP | 2667053 A2 | 11/2013 |
| JP | 2003199293 A | 7/2003 |
| WO | 2013050182 A1 | 4/2013 |

* cited by examiner

ELECTRIC DRIVE COMPRISING HEAT EXCHANGER SECTION BETWEEN OIL AND A COOLING FLUID

CROSS-REFERENCE TO RELATED APPLICATIONS

This application is the U.S. National Phase of PCT Appln. No. PCT/DE2020/100282 filed Apr. 7, 2020, which claims priority to DE 10 2019 109 313.9 filed Apr. 9, 2019, the entire disclosures of which are incorporated by reference herein.

TECHNICAL FIELD

The disclosure relates to an electric drive for a vehicle having an electric motor, a supply device, a transmission, an oil circuit, a heat exchanger, a supply housing region, and an end cover.

BACKGROUND

Electric axles are intended for the smallest vehicle installation spaces. Heat dissipation out of the system is increasingly important because of the power density they achieve. While the electric motor and power electronics are water-cooled in all relevant applications, the transmission is usually cooled by convection through the airstream flowing onto the outer surfaces of the housing. As a result, the achievable cooling performance is limited and the vehicle's drag coefficient is worsened.

Transmission oil cooling systems according to the prior art are usually designed as tube bundle or plate heat exchangers. These are placed in the oil pan, the oil sump or near the transmission. A corresponding example of a heat exchanger built into the transmission system is shown in the publication DE 10315684 A1. Here a heat exchanger module is mounted and sealed through an opening in the transmission housing. This is how the tube bundles of the heat exchanger get into the oil sump of the transmission. On the outer side of the module, there are connections for the inlet and outlet of the coolant.

In DE 11 2008 002 870 B4, JP 2003199293A, DE 102 96 733 B4 and US 2004/01 24722 A1, arrangements that are comparable in structure are disclosed. US 2004/01 24722 A1 shows an electric drive for a hybrid vehicle with an internal combustion engine, an electric motor and a generator, as well as a driven axle. The internal combustion engine, the electric motor, the generator and the axle are operatively connected to one another via a transmission. A supply device for supplying the electric motor with electrical energy sits on top of the housing of the electric drive. The drive also has an oil circuit for supplying the transmission with oil and for cooling the supply device or the electric motor. A housing portion protected by a cover for receiving the supply unit is placed on the housing of the electric drive. A heat exchanger is formed at this connection, by means of which the cooling of the supply unit is ensured. A cooling structure of the heat exchanger and a counterpart cooling structure on the surface of the housing portion lie opposite one another.

U.S. Pat. No. 6,201,365 B1 discloses an electric drive for a vehicle with two electric motors. On top of this drive, the supply device is placed on its housing. The heat exchange between the supply device and lubricating oil is generally also provided in the drive unit. For this purpose, the connection between the housing of the supply device and the housing of the electric motor has an intermediate wall with cooling ribs. When the electric motor is in operation, oil fed in from an oil sump and running in channels cools this connection. The oil in turn is cooled in the oil sump accommodated in an oil pan on the bottom of the housing of the electric drive from the underside of the electric drive via cooling ribs running on the outside of the housing.

The subsequently published document DE 10 2018 130 124 by the applicant discloses an electric drive for a vehicle of the generic type.

DE 10 2011 084 030 A1 by the applicant discloses an electromotive drive unit for an electric axle. This drive unit is compact and accommodates an electric motor and a transmission in a common housing. The transmission oil is in an oil circuit and is collected on the bottom in an oil pan designed as a dry sump. The oil pan is formed in an oil pan housing, which is placed on the bottom side over the entire length of the common housing drive unit on the bottom region of the housing of the drive unit. The oil pan housing thus covers the floor region for the electric motor and is provided with a heat exchanger portion, the dry sump and a cooling circuit. The heat exchanger portion is coupled on one side to the dry sump of the oil circuit and on the other side to the cooling circuit. The surface of the oil pan housing portion is optionally provided on the underside with cooling ribs, which point away from the housing and by which the surface on the underside of the oil sump housing is enlarged.

SUMMARY

It is desirable to demonstrate a design implementation of transmission oil cooling in an electric drive.

An electric drive has an end cover, wherein the end cover closes the heat exchanger portion. In particular, the end cover delimits an oil guide region in the heat exchanger portion. The end cover is arranged on an underside of the electric drive.

The end cover may have functional regions, wherein the functional regions are a counterpart cooling structure and an oil sump region.

The end cover may be designed in one part and/or in one piece. For example, the end cover may be designed as a cast part, in particular as an aluminum die-cast part.

The counterpart cooling structure may form part of the oil guide region in the heat exchanger portion. In particular, the counterpart cooling structure may be arranged on an inner side of the end cover, specifically molded on. The counterpart cooling structure may enlarge the surface of the end cover on the inner side compared to the base region of the end cover in the region of the counterpart cooling structure. The surface of the end cover in the region of the counterpart cooling structure may be more than 1.3 to 1.5 times larger than the base surface of the end cover in the same region. The region of the counterpart cooling structure may correspond to the region of the heat exchanger portion.

The oil sump region may be trough-shaped or shell-shaped and/or may accommodate an oil volume of at least 0.3 L to 0.4 L. The oil volume to be taken up in the oil sump region may be greater than the oil volume to be taken up in the heat exchanger portion.

In the installation position of the end cover, the oil sump region may be arranged lower than the counterpart cooling structure.

According to one embodiment, a pump interface for receiving an oil pump may be provided as a further functional region. The pump interface may form a fluidic and/or mechanical connection to an oil pump. In the event that the end cover comprises the counterpart cooling structure, the oil sump region and the pump interface, the fluidic connection may form a fluidic connection to the oil sump region on one side and to the heat exchanger portion and/or to the counterpart cooling structure on the other side.

The integration of at least one functional region in the end cover allows complex structures to be transferred from the actual housing of the electric drive to the end cover, so that the complexity of the actual housing can be reduced.

An electric drive is suitable and/or designed for a vehicle. The vehicle can be a passenger car, truck or bus. Alternatively, the vehicle may be designed as a two-wheeler or a three-wheeler. The vehicle may be a hybrid vehicle or as a purely electric vehicle. The electric drive provides a main drive torque for the vehicle in order to move the vehicle in traffic.

The electric drive has at least or precisely one electric motor for generating a drive torque for the electric drive. In particular, the electric motor generates a main drive torque for the electric drive and/or the vehicle.

The electric drive also has a supply device for supplying the electric motor with electrical energy. In particular, the supply device comprises power electronics, wherein the power electronics convert a supply voltage for the electric motor that is present at the supply device. The supply device, in particular the power electronics, may have shift elements, in particular power modules.

The electric drive has a transmission for guiding the drive torque. The transmission can optionally have at least or precisely one gear ratio portion for translating the drive torque, in particular from a high speed to a low speed. Alternatively or additionally, the transmission can have a shift portion for shifting different gear ratios. Alternatively or additionally, the transmission can have a differential portion for distributing the drive torque, in particular the translated drive torque, to two outputs.

The electric drive has an oil circuit, in particular a lubrication system, for supplying the transmission with oil. The transmission may be arranged in a transmission space, wherein the transmission is lubricated and cooled with the oil in the transmission space. The oil circuit may be designed as an active oil circuit and/or may include an oil pump for actively delivering the oil in the oil circuit. In terms of flow, the oil pump may be designed to deliver the oil from an oil sump in the transmission space and to supply it to the transmission. The oil pan can be a dry sump or a wet sump.

Furthermore, the electric drive has a cooling circuit for cooling the supply device and/or for cooling the electric motor with a coolant. The coolant may be water-based or alcohol-based. It can optionally be provided that the cooling circuit has a coolant pump and/or that the cooling circuit is designed as an active cooling circuit. The coolant pump is designed fluidically to deliver the coolant to the supply device and/or to the electric motor.

In a first variant, the cooling circuit supplies both the supply device and the electric motor. In a second variant, the cooling circuit can supply the supply device without the electric motor; in a third variant, the cooling circuit can supply the electric motor without the supply device.

The electric drive has a heat exchanger portion, wherein the heat exchanger portion is coupled to the cooling circuit on one side and to the oil circuit on the other. The term "side" should be understood as being functional. The heat exchanger portion is designed to transfer thermal energy from one material flow to another. In particular, thermal energy is transferred from the material flow of the oil to the material flow of the coolant. However, it can also be provided that in particular in the case of a cold start of the electrical drive thermal energy may be transferred from the material flow of the coolant to the material flow of the oil, since the supply device and/or the electric motor provides thermal energy earlier than the transmission due to electrical power loss during a cold start.

The cooling management of the electric drive is advantageously designed as a system-integrated solution that uses the cooling circuit already present in the electric drive. The heat exchanger portion is intended to cool the transmission oil in driving situations with high power dissipation. Nevertheless, in cold start situations, the oil should be brought to operating temperature as quickly as possible in order to reduce the power losses in the transmission. The heat exchanger portion thus becomes a thermal management component.

If necessary, it would be conceivable to also have a second electric motor for the main drive or as a torque vectoring drive. The oil for this electric motor can then also be cooled from the supply device.

The supply device may be arranged in a supply housing region. In particular, the electric drive may have a multi-part housing, wherein the supply housing region forms a portion of the housing. The heat exchanger portion may form a wall portion of the supply housing region. In this structural embodiment, the heat exchanger portion is shown as a wall portion, wherein the side of the heat exchanger portion for the oil circuit forms an outer wall region and the side of the heat exchanger portion for the cooling circuit forms an inner wall region. It is possible to thermally couple the supply device via the inner wall region, preferably to thermally couple it directly, and to thermally couple the oil circuit via the outer wall region, preferably to thermally couple it directly. In this embodiment, a structurally simple and at the same time space-saving embodiment is given.

The wall portion may have an outer cooling structure, wherein the outer cooling structure has the oil flowing through it and/or forms a fluidic portion in the oil circuit. The outer cooling structure may increase the surface region of the wall portion in order to reduce the thermal resistance.

The outer cooling structure is fluidically closed by the end cover, so that the oil can flow through the outer cooling volume formed between the end cover and the outer cooling structure and/or the wall portion without loss. The oil may be guided between the end cover and the outer cooling structure and/or the wall portion in a meandering, labyrinth, coiled or zig-zag shape. In particular, the guiding of the oil between the inlet and the outlet of the outer cooling volume may be designed in such a way that an extended cooling path is artificially formed.

The outer wall region facing the oil may be accessible for production for a corresponding tool part in the die-casting tool. It is therefore closed by the end cover, which prevents fluid from escaping into the environment, for example by means of a screw connection and a flange seal. This end cover is manufactured, for example, using plastic injection molding, but optionally also using a different manufacturing process. In the case of increased demands on robustness, the end cover can be used in particular as a formed sheet metal part or as a cast part, in particular as a die-cast part.

The counterpart cooling structure and the outer cooling structure together form the oil guide region, the oil guide region having the oil flowing through it and/or forming a fluidic portion in the oil circuit. The outer cooling structure and the counterpart cooling structure preferably interlock and/or are interlocked so that the common oil guide region is lengthened. In particular, the interlocking takes place in the installed position of the end cover in the vertical direction.

The counterpart cooling structure may be designed as a plurality of ribs, wherein the ribs are oriented transversely to the direction of flow in the oil circuit. The outer cooling structure may engage in gaps between the ribs, in particular in such a way that the oil guide region varies in height.

The oil sump region may be designed as a dry sump region. In this embodiment, the transmission is lubricated and/or cooled by an active oil supply, which is ensured by the oil pump.

The pump interface may have a mechanical interface for a receiving housing for receiving the oil pump and/or for the oil pump directly. The pump interface also has a fluidic interface.

In a first alternative, the electric drive has a motor housing region for the electric motor. The motor housing region forms a portion of the housing. The supply housing region and the motor housing region are formed integrally with one another. In a second alternative, the electric drive has a transmission housing region for the transmission. The transmission housing region forms a portion of the housing. The supply housing region and the gear housing region are formed integrally with one another. The supply housing region and the additional region according to the alternatives may be made in one piece from an aluminum alloy, in particular by the die-casting process. With both alternatives, the supply housing region can thus be produced inexpensively in addition to the respective other region. In this way, the greatest possible savings in terms of components and a cost-effective design can be achieved. The supply housing region can also be produced and/or arranged separately, wherein the fluidic connection is made via connecting elements, such as hoses or pipes.

Thus, oil cooling preferably takes place in the following power flow:
Heat transfer from oil to the housing material of the supply housing region;
Heat conduction in the housing material;
Heat transfer from the housing material to the coolant.

The wall portion may have an inner cooling structure, wherein the inner cooling structure has the coolant flowing through it and/or forms a fluidic portion in the cooling circuit. The inner cooling structure may increase the surface region of the wall portion in order to reduce the thermal resistance.

The electric drive may have a heat-conducting plate for covering the inner cooling structure and for coupling to the supply device. The inner cooling structure is fluidically closed off from the supply device by the heat-conducting plate, so that the inner cooling volume formed between the heat-conducting plate and the inner cooling structure and/or the wall portion can be flowed through by the coolant without loss. The guiding of the coolant between the heat-conducting plate and the inner cooling structure and/or the wall portion may be designed in a meandering, labyrinth, spiral or zig-zag shape. In particular, the guiding of the coolant between the inlet and the outlet of the inner cooling volume may be designed in such a way that an extended cooling path is artificially formed. The supply device, in particular the power electronics, may be arranged on the side of the heat-conducting plate facing away from the cooling structure and/or the wall portion, so that there is thermal coupling between the supply device, in particular the power electronics, and the coolant via the heat-conducting plate. The heat-conducting plate can be of planar design; in alternative configurations, the heat-conducting plate can also be implemented as a 3-D component. The inner cooling structure may extend in a planar and/or flat manner.

The inner and/or the outer cooling structure can have cooling ribs, cooling pins, cooling knobs, or other shaped elements to enlarge the surface. The inner cooling structure and/or the outer cooling structure may be formed in one piece with the wall portion and/or with the supply housing region, so that the cooling structure(s) can be manufactured together in a prototyping manner with the wall portion and/or with the supply housing region, preferably in the original shape. In this way, the heat exchanger portion can be integrated particularly cost-effectively.

The electric drive may be designed as an electric axle, wherein the electric axle preferably has two output shafts, wherein the output shafts are each operatively connected to a driven wheel of the vehicle. In this embodiment, the electric drive has a very compact design, so that the heat management described can be used particularly effectively.

BRIEF DESCRIPTION OF THE DRAWINGS

Further features, advantages and effects result from the following description of preferred exemplary embodiments and the attached figures. In the figures.

DETAILED DESCRIPTION

Figure 1:
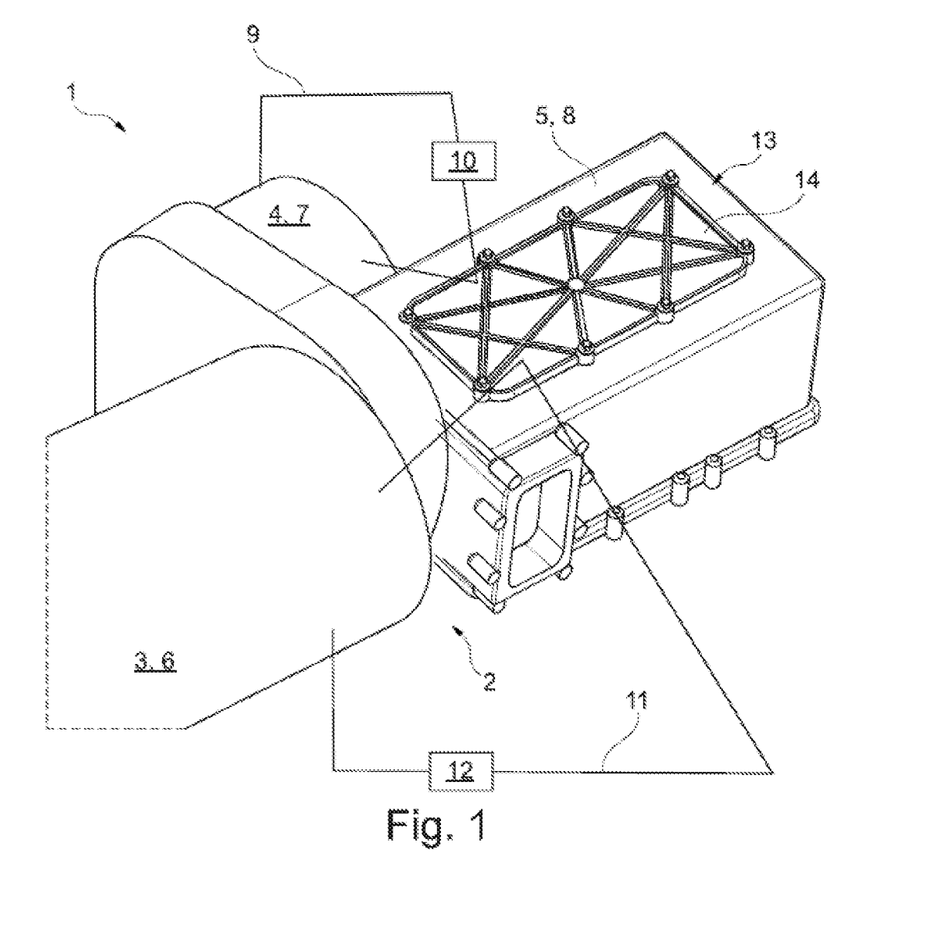
FIG. 1 shows a schematic three-dimensional representation of an electric drive for a vehicle.

FIG. 1 shows, in a schematic three-dimensional representation, an electric drive 1 for a vehicle, wherein the electric drive is designed as an electric axle. The electric drive 1 has a housing 2, wherein the housing 2 can be functionally divided into a motor housing region 3, a gear housing region 4 and a supply housing region 5. The housing 2 is designed as a die-cast aluminum housing and is realized in multiple parts. In this exemplary embodiment, the gear housing region 4 and the supply housing region 5 form a common component, which is designed as a die-cast part made of an aluminum alloy.

An electric motor 6, which provides a drive torque for the electric drive 1, is arranged in the motor housing region 3. A transmission 7 is arranged in the gear housing region 4, wherein the transmission 7 converts the drive torque and distributes it to two output shafts, not shown. A supply device 8, which provides the electrical energy for the electric motor 6, is arranged in the supply housing region 5. In particular, the supply device 8 comprises power electronics with shift elements and/or power modules for providing the electrical energy for the electric motor 6.

The transmission 7 is cooled and lubricated with oil via an oil circuit 9, wherein the cooling circuit 9 has one or more oil pumps 10 for conveying the oil. The oil circuit 9 is only shown in a highly schematic manner; the components of the oil circuit 9 can also be distributed differently.

The electric motor 6 and/or the supply device 8 are cooled with a coolant via a cooling circuit 11. The cooling circuit 11 optionally has a coolant pump 12.

The supply housing region 5 has a heat exchanger portion 13 which, from a functional point of view, transfers thermal energy from the material flow of the oil from the oil circuit 9 to the material flow of the coolant from the cooling circuit 11 or in the opposite direction. In the first exemplary embodiment, the heat exchanger portion 13 is arranged under an end cover 14 or is also formed by this, as will be explained below.

Figure 2:
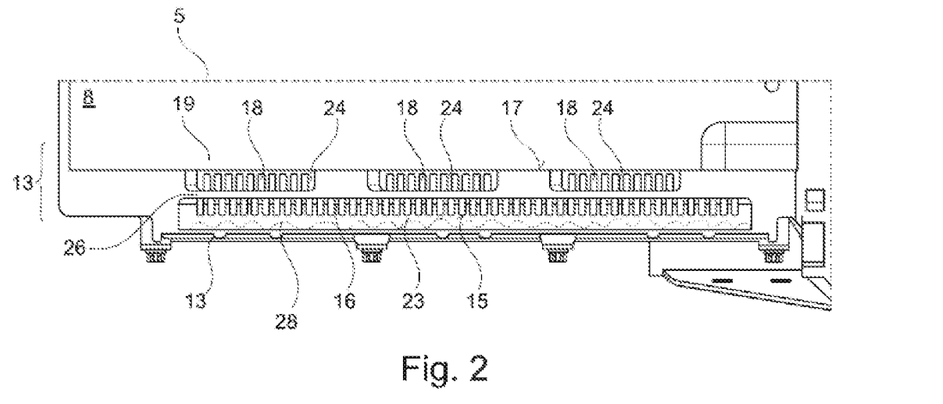
FIG. 2 shows a sectional representation of the supply housing region of the electric drive in FIG. 1 in the region of a heat exchanger portion.

FIG. 2 shows a schematic section through the heat exchanger portion 13, wherein it is evident that the heat exchanger portion 13 is formed by a wall portion of the supply housing region 5. In particular, the heat exchanger portion 13 is designed in one piece with the supply housing region 5.

On an outer wall region 15, the heat exchanger portion 13 has outer cooling structures 16, which are molded into the wall portion in the outer wall region 15. The outer cooling structures 16 are fluidically closed by the end cover 14, so that the oil of the oil circuit 9 can flow through the outer cooling volume 23 formed thereby directly and/or without loss.

On an inner wall region 17, the heat exchanger portion 13 has inner cooling structures 18, which are molded into the wall portion in the inner wall region 17. The inner cooling structures 18 are fluidically closed by a heat-conducting plate 19, shown only schematically, or another heat-conducting body, so that the coolant of the cooling circuit 11 can flow through the resulting inner cooling volume 24 without loss. The supply device 8 is arranged on the heat-conducting plate 19 or the heat-conducting body, so that waste heat generated during operation can be dissipated into the cooling circuit 11 via the heat-conducting plate 19 or the heat-conducting body.

Between the inner cooling structures 18 and the outer cooling structures 16 there is a residual wall section of the supply housing region 5, which implements a fluidic separation but a thermal coupling between the cooling structures 18 and 16. In particular, the remaining wall portion is formed from the aluminum alloy of the supply housing region 5.

Figure 3:
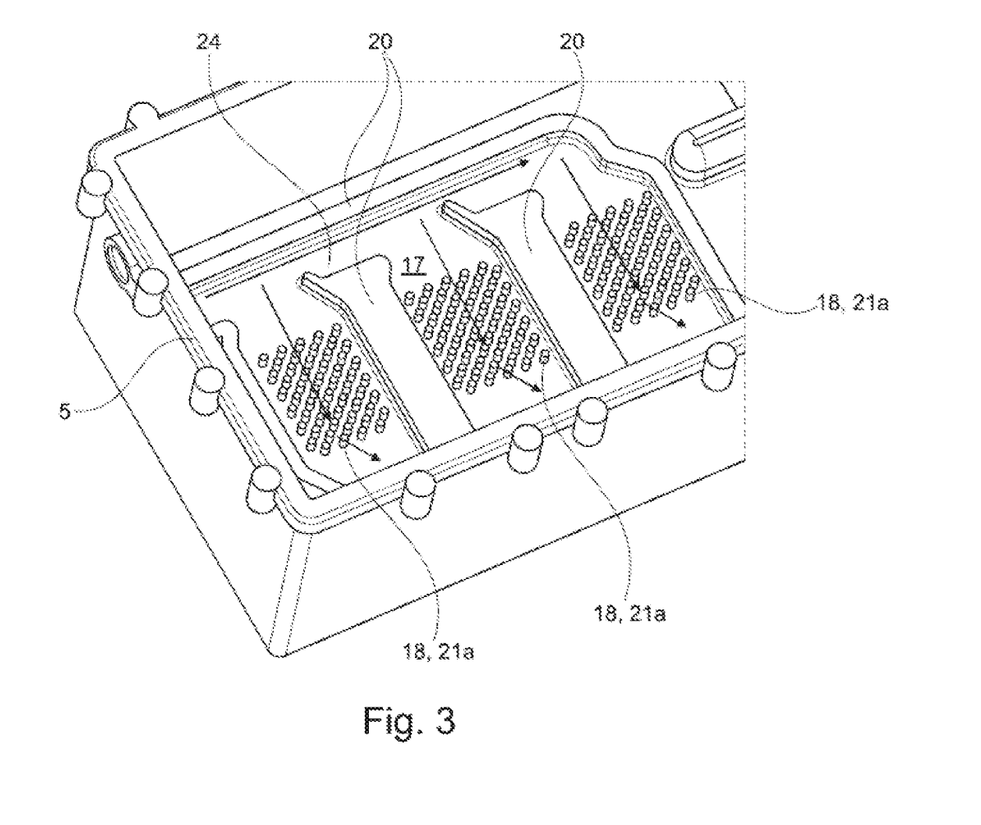
FIG. 3 shows a schematic three-dimensional plan view of an inner wall region of the supply housing region in the region of the heat exchanger portion.

FIG. 3 shows a schematic three-dimensional top view of the inner wall region 17, wherein it can be seen that the inner cooling structures 18 are arranged in a flat region and are formed by three sub-portions through which the arrows flow in parallel and which have cooling pins to enlarge the surface 21*a*. Furthermore, sealing elements 20 can be seen which fluidically seal the inner cooling volume 24 through which the flow is flowing with the heat-conducting plate 19 or the heat-conducting body.

Figure 4:
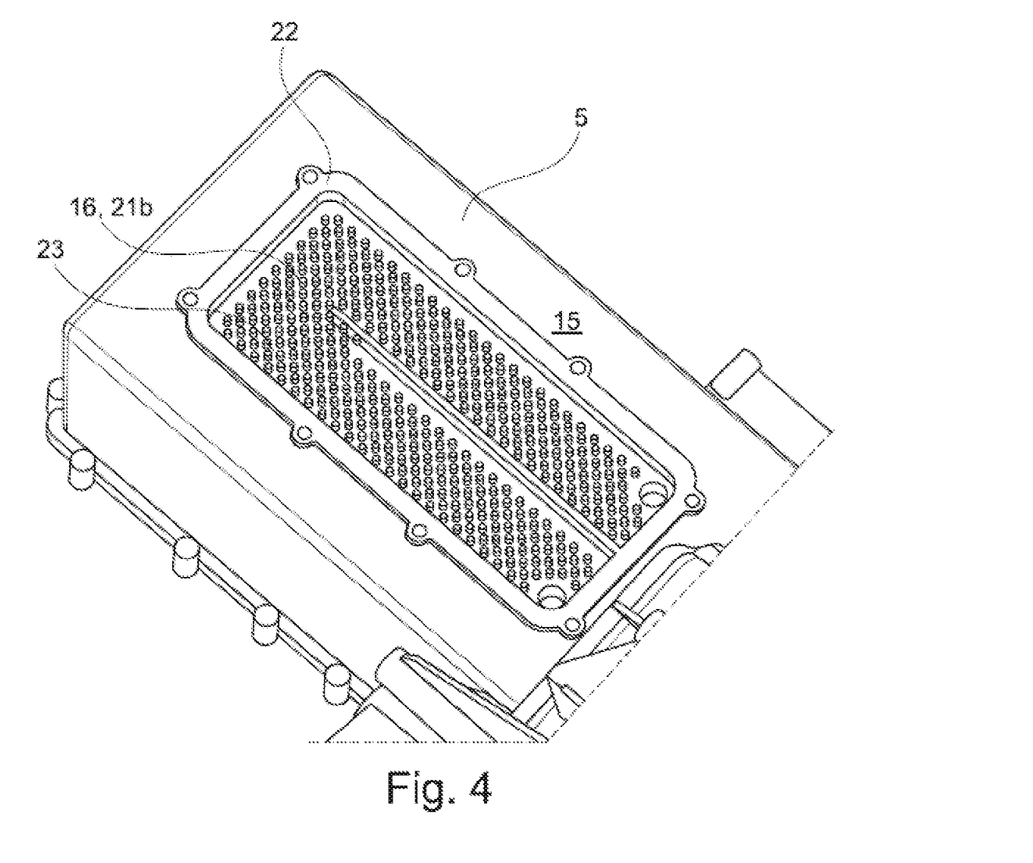
FIG. 4 shows a schematic three-dimensional plan view of an outer wall region of the supply housing region in the region of the heat exchanger portion.

FIG. 4 shows a schematic three-dimensional top view of the outer wall region 15, wherein it can be seen that the outer cooling structures 16 are also arranged in a flat region and are formed by two sub-portions which are flowed through in series and which have cooling pins 21*b* to enlarge the surface. A circumferential flange seal 22 can also be seen, which fluidically seals the outer cooling volume 23 with the end cover 14.

As indicated by a dotted line in FIG. 2, the end cover 14 can have a counterpart cooling structure 28, wherein the counterpart cooling structure 28 protrudes into the outer cooling volume 23 and enlarges the surface of the end cover 14 compared to a flat configuration. In this way, heat can be supplied or removed through the end cover 14.

Figure 5:
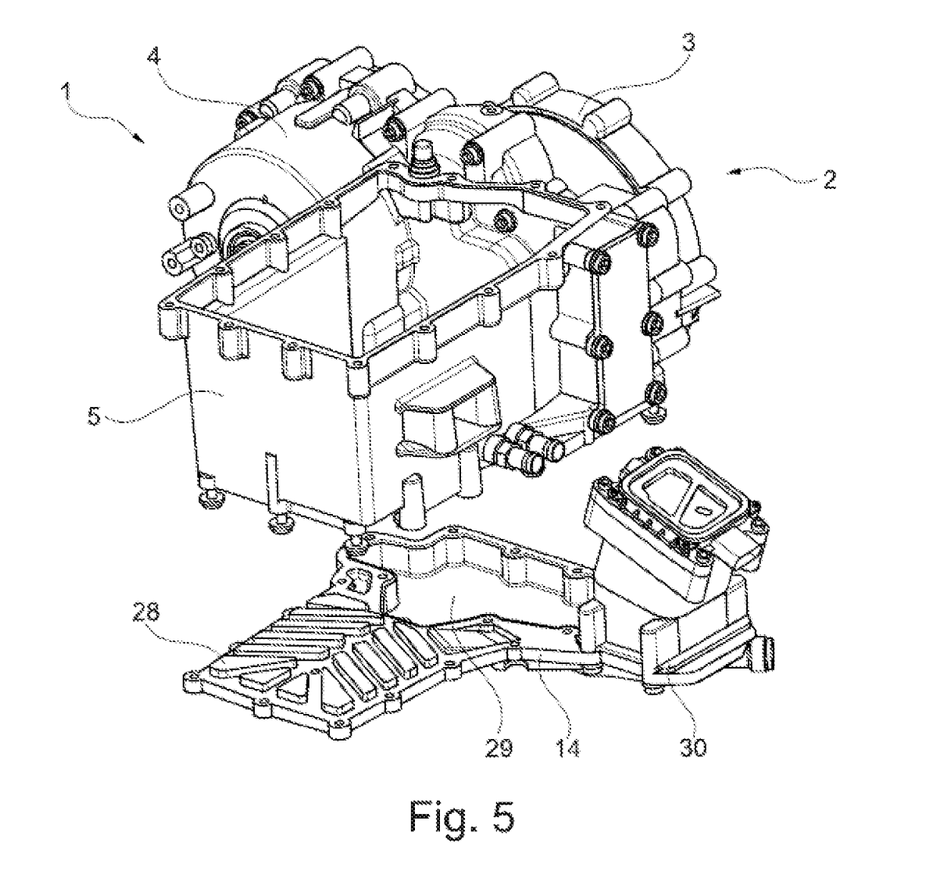
FIG. 5 shows a schematic three-dimensional representation of an electric drive.

FIG. 5 shows an electric drive 1 as a second exemplary embodiment in a schematic three-dimensional representation. The electric drive 1 has a housing 2, wherein the housing 2 has a portion of a motor housing region 3 for coupling an electric motor, not shown, and a gear housing region 4 for receiving a transmission 7. Furthermore, the housing 2 has a supply housing region 5 for receiving a supply device, not shown. In particular, the electric drive 1 of FIG. 5 and the following forms a variant of the electric drive 1 of the first exemplary embodiment. Reference is therefore made to the first exemplary embodiment for the description. In particular, the first and second exemplary embodiments differ in terms of the end cover 14 and the arrangement of the oil pump 10.

The end cover 14 is designed as a metal part, in particular as a cast part, for example as an aluminum die-cast part. Three functional regions are integrated in the end cover 14, namely the already mentioned counterpart cooling structure 28, an oil sump region 29 and a pump interface 30.

The end cover 14 extends under the heat exchanger portion 13 and/or the supply housing region 5 as well as an intermediate region between the motor housing region 3 and the transmission housing region 4. Furthermore, the end cover 14 with the pump interface 30 protrudes laterally beyond the base of the housing 2, so that the pump interface 30 is arranged next to the housing 2.

Figure 6:
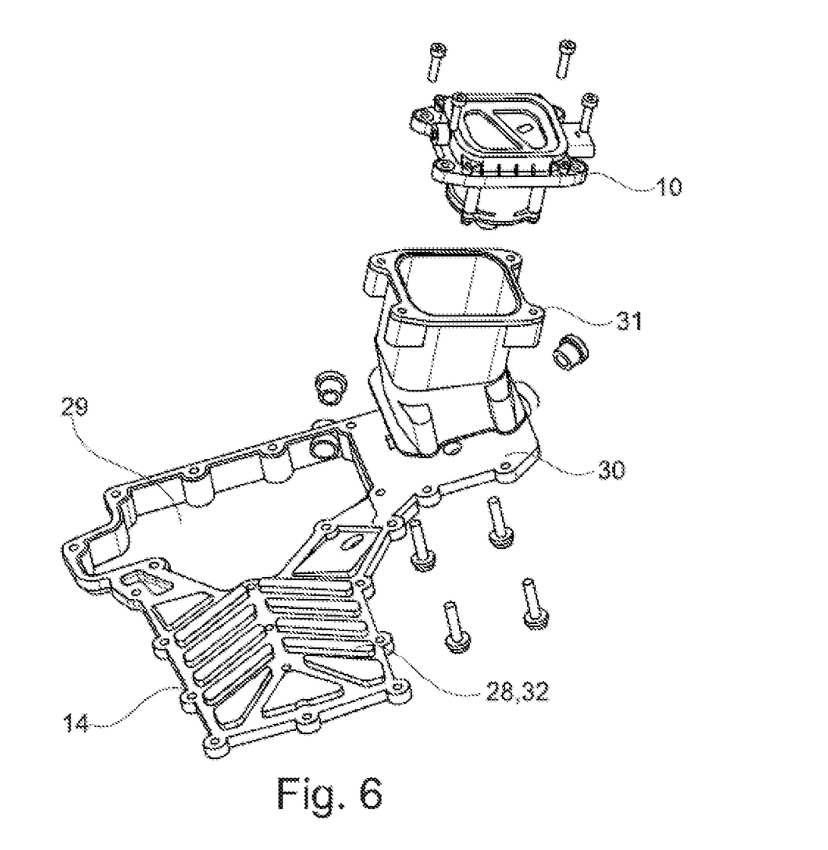
FIG. 6 shows a three-dimensional exploded representation of the end cover with adjoining components of the electric drive of FIG. 5.

FIG. 6 shows the end cover 14 in an individual representation, wherein components for the oil pump 10 are graphically supplemented in an exploded illustration. A receiving housing 31 is fastened to the end cover 14 at the pump interface 30 by means of a screw connection, wherein the oil pump 10 is inserted into the receiving housing 31. The pump interface 30 thus forms a mechanical interface for the oil pump 10.

The oil sump region 29 is designed as a recess so that it provides an oil sump region volume of, for example, 0.5 L. The oil sump region 29 is fluidically connected to the pump interface 30 so that the oil pump 10 can pump oil out of the oil sump region 29. In particular, the oil circuit 9 runs from the oil sump region 29 via the pump interface 30 and the oil pump 10 into the heat exchanger portion 13.

Figure 8:
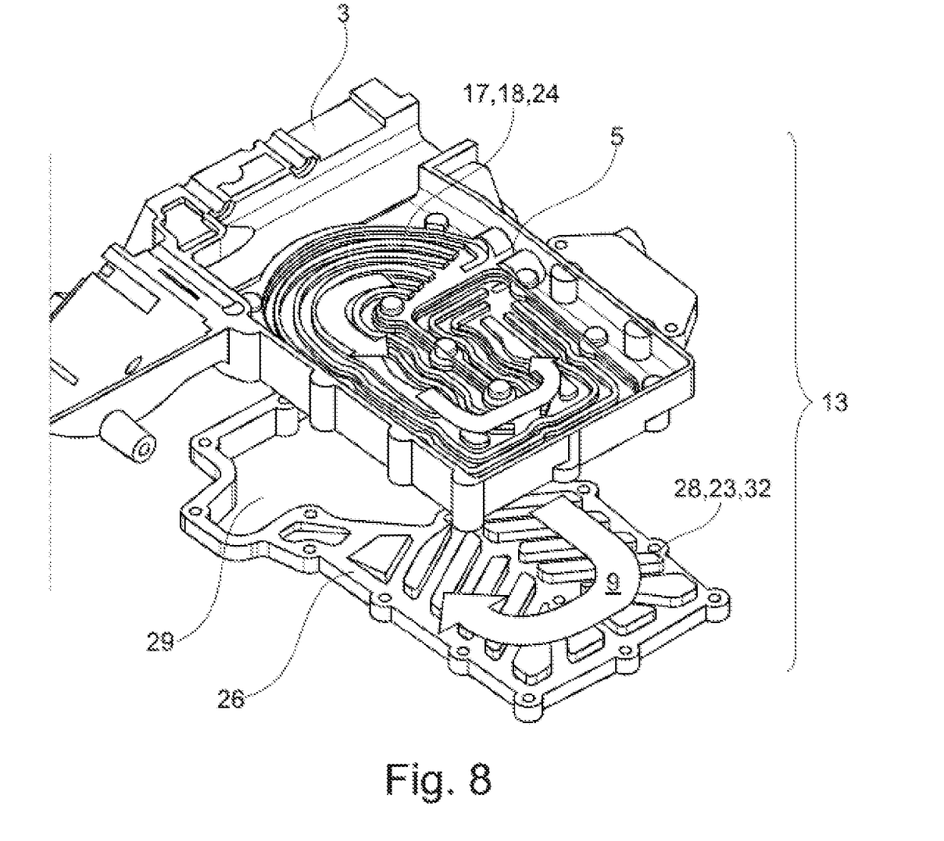
FIG. 8 shows a three-dimensional exploded representation of the end cover with the adjacent supply housing region of the electric drive from FIG. 5.

The counterpart cooling structure 28 is arranged higher than the oil sump region 29 in the installed position of the end cover 14 and has a plurality of ribs 32, wherein the ribs as can best be seen in FIG. 8—are oriented transversely to the oil circuit 9 in the heat exchanger portion 13. The large number of ribs 32 increases the surface area of the end cover 14.

Figure 7:
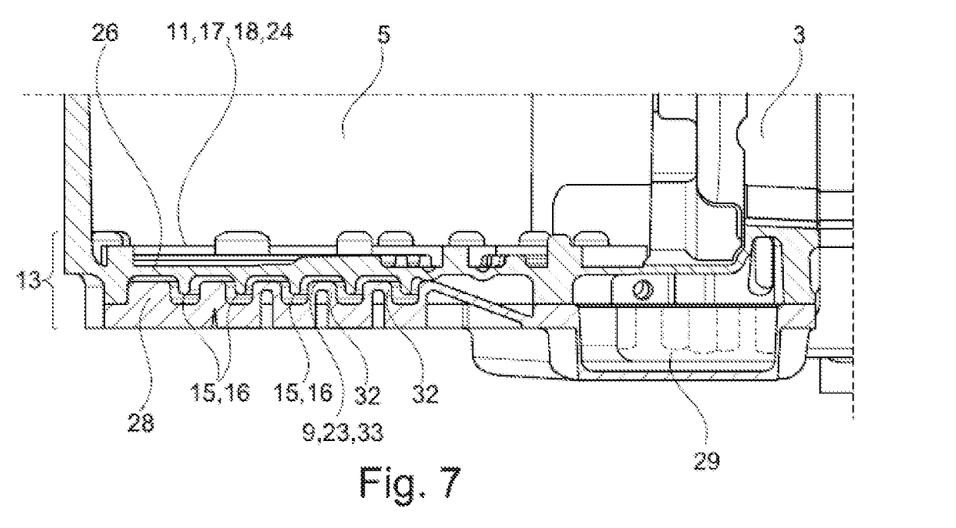
FIG. 7 shows a sectional representation through the electric drive of FIG. 5.

FIG. 7 shows the region of the heat exchanger portion 13 in a schematic longitudinal section through the electric drive 1. On the right-hand side, in the transition region between the supply housing region 5 and the motor housing region 3, the oil sump region 29 can be seen. Below the supply housing region 5, in particular in the region of the heat exchanger portion 13, the counterpart cooling structure 28 can be seen in section. In the wall portion of the supply housing region 5 on the outer wall region 15, outer cooling structures 16 are molded, which engage in spaces between the ribs 32 of the counterpart cooling structure 28, so that the outer cooling structures 16 are interlocked with the counterpart cooling structure 28. An oil guide region 33, which forms a portion of the oil circuit 9, is formed in the outer cooling volume 23 between the outer cooling structures 16 and the counterpart cooling structure 28. The oil guide region 33 runs alternately between lower-lying portions, which are formed by the floor between the ribs 32, and higher-lying portions, which are formed by the ceiling between the outer cooling structures 16. As a result, the portion of the oil circuit 9 formed by the oil guide region 33 is designed to be lengthened, so that a thermal connection is improved.

Inner cooling structures 18 are arranged, in particular integrally formed, on the inner wall region 17 and form a portion of the inner cooling volume 24 and thus of the cooling circuit 11. As in the previous exemplary embodiment, the inner cooling volume 24 is covered, for example, by a heat-conducting plate 19, not shown, which is in thermal contact with the supply device 8, not shown.

Optionally, a reservoir (not shown) can be provided below the counterpart cooling structures 28, which is fluidically connected to the oil sump region 29. In this way, a larger amount of oil can be provided in the oil circuit 9. The reservoir can be integrated into the end cover 14. The oil sump region 29 and possibly the reservoir form a low-pressure region for the oil. Fluidically, a high-pressure region for the oil in the oil circuit 9 follows the oil pump 10 in the heat exchanger portion 13. Following the heat exchanger portion 13, the oil circuit 9 runs in the transmission housing portion 4 to the transmission 7.

In FIG. 8, the end cover 14 is shown again together with a partially cut end region of the electric drive 1 or the supply housing region 5. In this representation, the oil circuit 9 and the cooling circuit 11 are shown schematically, wherein it can be seen that the two circuits 8, 11 are oriented in opposite directions. This has the advantage that the greatest temperature differences always coincide. In the case of a cold start, the cold oil meets the coolant at the beginning of the heat exchanger portion 13, which has already flowed through the heat exchanger portion 13 and is therefore already warmed up by the supply device 8. This achieves a maximum heating output for the oil. In the operating state, the oil can give off heat to the cooling circuit 11.

LIST OF REFERENCE SYMBOLS

1 Electric drive
2 Housing
3 Motor housing region
4 Transmission housing region
5 Supply housing region
6 Electric motor
7 Transmission
8 Supply device
9 Oil circuit
10 Oil pump
11 Cooling circuit
12 Coolant pump
13 Heat exchanger portion
14 End cover
15 Outer wall region
16 Outer cooling structures
17 Inner wall region
18 Inner cooling structures
19 Heat-conducting plate
20 Sealing elements
21a, b Cooling pins
22 Flange seal
23 Outer cooling volume
24 Inner cooling volume
25 Empty
26 Wall portion
27 Housing wall
28 Counterpart cooling structure
29 Oil sump region
30 Pump interface
31 Receiving housing
32 Ribs

The invention claimed is:

1. An electric drive for a vehicle, comprising:
at least one electric motor for generating a drive torque;
a supply device for supplying the electric motor with electrical energy;
a transmission for guiding the drive torque;
an oil circuit for supplying the transmission with oil;
a cooling circuit for cooling the supply device or the electric motor with a coolant;
a heat exchanger portion coupled on a first side to the cooling circuit and on a second side to the oil circuit;
a supply housing region, the supply device being arranged in the supply housing region and the heat exchanger portion forming a wall portion of the supply housing region;
an end cover closing the heat exchanger portion;
wherein the end cover has functional regions, wherein the functional regions are formed at least by a counterpart cooling structure facing the heat exchanger portion and by an oil sump region, wherein a surface of the end cover is enlarged by the counterpart cooling structure in the region of the counterpart cooling structure relative to one of a plurality of base surfaces of the end cover on which the counterpart cooling structure is formed on the end cover;
wherein the wall portion has an outer cooling structure, wherein the outer cooling structure and the counterpart cooling structure together form an oil guide region, wherein the oil flows through the oil guide region; and
wherein the counterpart cooling structure is arranged higher than the oil sump region in an installed position, and the oil sump region is laterally offset from the counterpart cooling structure.

2. The electric drive according to claim 1, wherein the counterpart cooling structure is designed as a plurality of ribs, wherein the ribs are oriented transversely to the direction of flow in the oil circuit.

3. The electric drive according to claim 1, wherein the oil sump region is a dry sump region.

4. The electric drive according to claim 1, wherein a further functional region is formed by a pump interface for coupling an oil pump, wherein the pump interface has a mechanical interface for a receiving housing and a fluidic interface for the oil circuit.

5. The electric drive according to claim 1, further comprising a motor housing region for the electric motor, wherein the supply housing region is designed in one piece with the motor housing region.

6. The electric drive according to claim 1, wherein the wall portion has an inner cooling structure, wherein the coolant flows through the inner cooling structure.

7. The electric drive according to claim 6, further comprising a heat-conducting plate for covering the inner cooling structure and for thermal coupling to the supply device.

8. The electric drive according to claim 1, wherein the electric drive is an electric axle.

9. The electric drive according to claim 1, further comprising a transmission housing region for the transmission, wherein the supply housing region is designed in one piece with the transmission housing region.

* * * * *